United States Patent
Lee

(10) Patent No.: US 6,591,714 B2
(45) Date of Patent: Jul. 15, 2003

(54) COUPLING DEVICE

(75) Inventor: Hyeongcheol Lee, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/908,289

(22) Filed: Jul. 18, 2001

(65) Prior Publication Data

US 2003/0015060 A1 Jan. 23, 2003

(51) Int. Cl.⁷ .............................................. F16H 48/14
(52) U.S. Cl. .................. 74/650; 192/54.52; 192/103 F
(58) Field of Search ........................... 74/650; 180/233, 180/383; 192/59, 103 F, 54.52, 48.8, 49

(56) References Cited

U.S. PATENT DOCUMENTS

| | | |
|---|---|---|
| 473,444 A | 4/1892 | Barney |
| 1,677,996 A | 7/1928 | Wingquist |
| 2,175,520 A * | 10/1939 | Fredrickson ................. 74/650 |
| 2,623,619 A * | 12/1952 | Clerk ...................... 192/54.52 |
| 2,986,024 A | 5/1961 | Power |
| 3,118,292 A * | 1/1964 | Schröter et al. ......... 192/54.52 |
| 3,350,961 A | 11/1967 | Dodge |
| 3,724,289 A | 4/1973 | Kennicutt |
| 3,831,461 A | 8/1974 | Mueller |
| 4,012,968 A | 3/1977 | Kelbel |
| 4,462,272 A | 7/1984 | Roper |
| 4,493,227 A | 1/1985 | Schmid |
| 4,630,505 A | 12/1986 | Williamson |
| 4,633,735 A | 1/1987 | Sakurai et al. |
| 4,676,336 A | 6/1987 | Hiramatsu et al. .......... 180/233 |
| 4,719,817 A | 1/1988 | Azuma |
| 4,719,998 A | 1/1988 | Hiramatsu et al. |
| 4,730,514 A | 3/1988 | Shikata et al. |
| 4,779,698 A | 10/1988 | Iwata ......................... 180/247 |
| 4,838,118 A | 6/1989 | Binkley |

(List continued on next page.)

FOREIGN PATENT DOCUMENTS

| | | | |
|---|---|---|---|
| EP | 0825362 | 2/1998 | |
| EP | 0886083 | 12/1998 | |
| EP | 0911204 | 4/1999 | ................. 180/248 |
| GB | 2 187 824 | 3/1986 | |
| GB | 2 252 801 | * 8/1992 | ................. 74/650 |
| JP | 401182127 A | 7/1989 | |
| JP | 1-261553 | * 10/1989 | ................. 74/650 |
| JP | 200062495 | 2/2000 | |
| JP | 200074096 | 3/2000 | |
| JP | 2001-163079 | 6/2001 | |

OTHER PUBLICATIONS

WO 94/29618, Published Dec. 22, 1994, Applicant: Vrijburg, International Application No. PCT/NL94/00130, entitled: Differential With Continuous Variable Power Distribution.

(List continued on next page.)

Primary Examiner—Sherry Estremsky
(74) Attorney, Agent, or Firm—Brooks Hofer Gilson & Lione

(57) ABSTRACT

A device for coupling an input shaft and an output shaft of an automobile is provided. The device preferably includes a rolling element, a holding element adapted to contain annular movement of the rolling element and allow axial movement of the rolling element, an annular cam adapted to cause axial movement of the rolling element upon relative rotational movement of the annular cam and the holding element, a pressure chamber, and a piston adapted to increase pressure in the pressure chamber upon axial movement of the rolling element and to resist axial movement of the rolling element upon the presence of sufficient pressure in the pressure chamber.

19 Claims, 6 Drawing Sheets

U.S. PATENT DOCUMENTS

| | | | |
|---|---|---|---|
| 4,841,809 A | 6/1989 | Jolly | |
| 4,867,012 A | 9/1989 | McGarraugh | |
| 4,884,653 A | 12/1989 | Kouno | |
| 4,905,808 A | 3/1990 | Tomita et al. | |
| 4,949,594 A * | 8/1990 | Galhotra | 74/650 |
| 4,960,011 A | 10/1990 | Asano | 74/650 |
| 4,966,268 A | 10/1990 | Asano et al. | |
| 4,974,471 A | 12/1990 | McGarraugh | |
| 4,987,967 A | 1/1991 | Kouno | |
| 4,995,491 A | 2/1991 | Hiramatsu et al. | 192/58 R |
| 5,007,886 A | 4/1991 | Holmquist et al. | |
| RE33,742 E | 11/1991 | Blessing et al. | |
| 5,092,825 A | 3/1992 | Goscenski, Jr. et al. | |
| 5,172,787 A | 12/1992 | Kobayashi | 180/197 |
| RE34,209 E | 3/1993 | McGarraugh | 475/89 |
| 5,189,930 A | 3/1993 | Kameda | 74/650 |
| 5,194,053 A | 3/1993 | Sano et al. | 475/89 |
| 5,201,820 A | 4/1993 | Hamada et al. | 180/233 |
| 5,415,598 A | 5/1995 | Sawase et al. | 475/86 |
| 5,445,574 A | 8/1995 | Sekiguchi et al. | |
| 5,456,641 A | 10/1995 | Sawase | |
| 5,469,950 A | 11/1995 | Lundström et al. | |
| 5,536,215 A | 7/1996 | Shaffer et al. | 475/88 |
| 5,542,316 A | 8/1996 | Spooner et al. | 74/650 |
| 5,690,002 A | 11/1997 | Showalter | 74/650 |
| 5,735,764 A | 4/1998 | Shaffer et al. | 475/88 |
| 5,827,145 A | 10/1998 | Okcuoglu | 475/88 |
| 5,888,163 A | 3/1999 | Shaffer et al. | |
| 5,893,812 A | 4/1999 | Narai et al. | |
| 5,915,513 A | 6/1999 | Isley, Jr. et al. | |
| 5,916,052 A | 6/1999 | Dick | |
| 5,938,555 A | 8/1999 | Leeper | 475/88 |
| 5,938,556 A | 8/1999 | Lowell | |
| 5,941,788 A | 8/1999 | Shaffer et al. | 475/88 |
| 5,964,126 A | 10/1999 | Okcuoglu | |
| 5,979,631 A * | 11/1999 | Lundstrom | 192/103 F |
| 5,984,822 A | 11/1999 | Schreier et al. | |
| 6,001,040 A | 12/1999 | Engle | |
| 6,019,694 A | 2/2000 | Forrest et al. | |
| 6,048,286 A | 4/2000 | Perry | |
| 6,056,658 A | 5/2000 | Illmeier | 475/188 |
| 6,095,939 A | 8/2000 | Burns et al. | 475/88 |
| 6,119,061 A | 9/2000 | Schenkel et al. | |
| 6,176,800 B1 | 1/2001 | Shaffer et al. | 475/88 |
| 6,186,258 B1 | 2/2001 | Deutschel et al. | 180/197 |
| 6,213,241 B1 | 4/2001 | Kita et al. | 180/248 |
| 6,216,841 B1 | 4/2001 | Hofer | 192/103 F |
| 6,332,522 B1 | 12/2001 | Morse et al. | 192/85 AA |

OTHER PUBLICATIONS

WO 87/06668, Published Nov. 5, 1987, Applicant: Scheidegger, Zwicky, Werner & Co., International Application No. PCT/CH86/00060.

WO 00/12915, Published Mar. 9, 2000, Applicant: McLaren Automotive Group, International Application No. PCT/US99/20054.

M. Okcuoglu, "*A Descriptive Analysis of Gerodisc Type Limited Slip Differentials and All Wheel Drive Couplings*", Society of Automotive Engineers, Inc., Copyright 1995, pp.15–20.

\* cited by examiner

COUPLING DEVICE

TECHNICAL FIELD OF THE INVENTION

This invention relates generally to devices in the automotive industry and, more specifically, to devices for coupling an input shaft and an output shaft of an automobile.

BACKGROUND OF THE INVENTION

Front-wheel-drive based vehicles with four-wheel-drive capabilities typically use a twin coupling device to couple a rear drive shaft, which travels from the engine to the rear of the vehicle, to a right half shaft and a left half shaft, which travel to the rear wheels. The twin coupling device typically provides front to rear wheel torque distribution, as well as left to right rear wheel torque distribution. Because of the advantages of four-wheel-drive, however, there is a need in the automotive industry for continuous improvement of the twin coupling device.

DETAILED DESCRIPTION OF THE PREFERRED EMBODIMENTS OF THE INVENTION

The following description of three preferred embodiments of the invention is not intended to limit the scope of the invention to these preferred embodiments, but rather to enable any person skilled in the art of automotive coupling devices to make and use the invention.

Figure 1:
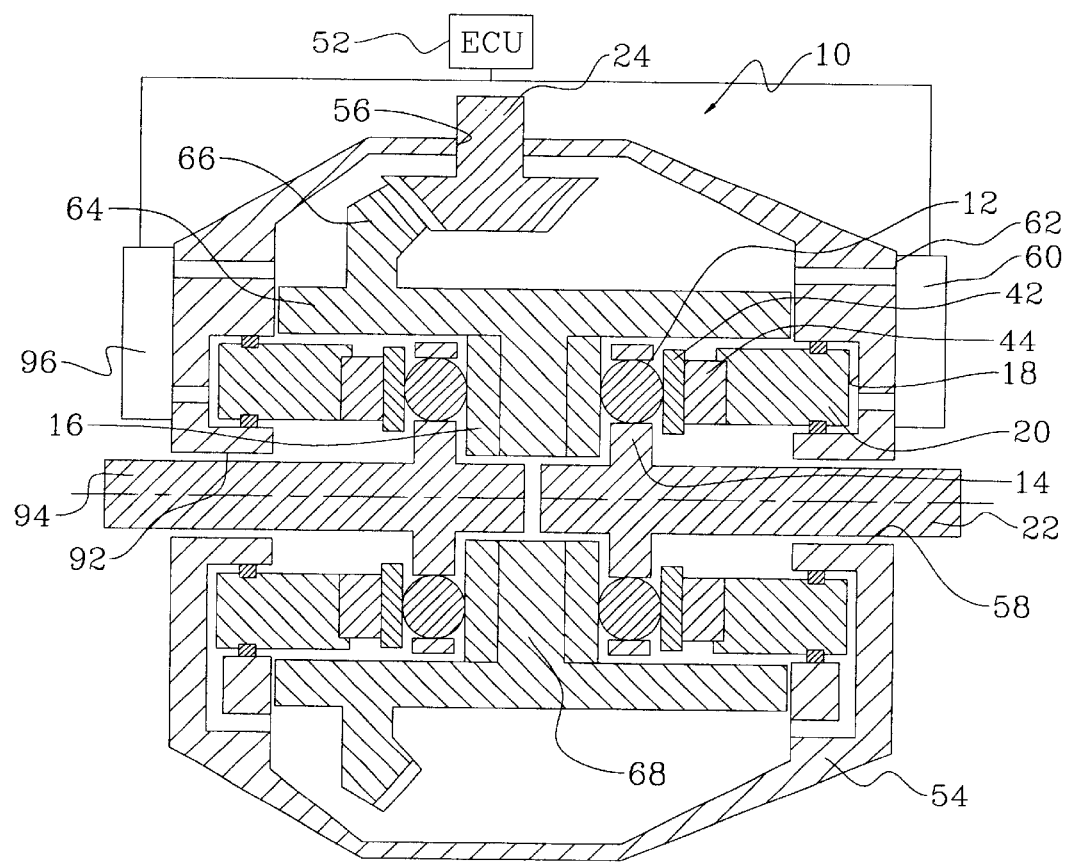
FIG. 1 is a cross-sectional view of the device of the first preferred embodiment.

As shown in FIG. 1, the coupling device 10 of the first preferred embodiment includes a rolling element 12, a holding element 14, an annular cam 16, a pressure chamber 18, and a piston 20. The holding element 14 is preferably coupled to the rolling element 12 and an output shaft 22. The annular cam 16 is preferably coupled to an input shaft 24 and the rolling element 12. The piston 20 is preferably coupled to the rolling element 12 and the pressure chamber 18.

Figure 2:
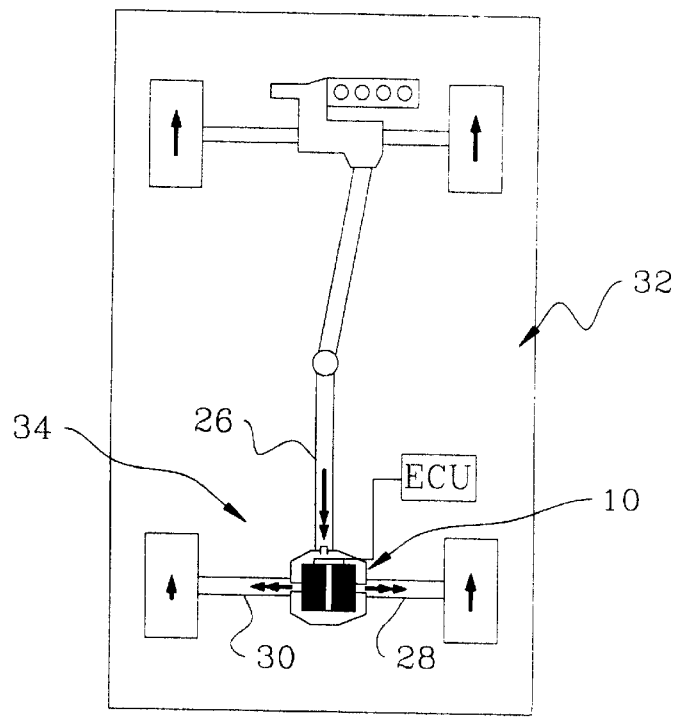
FIG. 2 is a schematic of the device in FIG. 1 arranged within a front-wheel-drive based vehicle with four-wheel-drive capabilities.

As shown in FIG. 2, the coupling device 10 of the first preferred embodiment has been specifically designed for coupling a drive shaft 26, a right half shaft 28, and a left half shaft 30 of a front-wheel-drive based vehicle 32 with four-wheel-drive capabilities. In this arrangement, the coupling device 10 of the first preferred embodiment is known as a twin coupling device 34. The coupling device 10, however, may be used in other suitable arrangements. As an example, the device may be used for coupling a front drive shaft and a rear drive shaft of a front-wheel-drive based vehicle with four-wheel-drive capabilities (known as a coupling device) or the device may be used for coupling a transmission output and a rear drive shaft in a rear-wheel-drive based vehicle with four-wheel-drive capabilities (known as a transfer case).

Figure 3A:
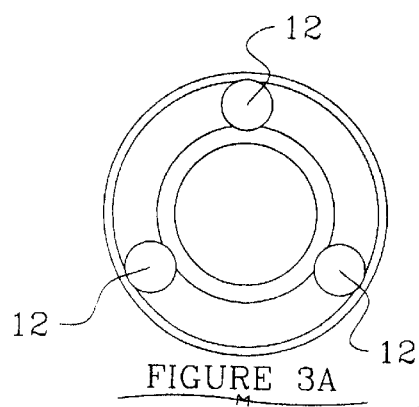
FIG. 3A is a top view of the annular cam and the rolling element of the device in FIG. 1.

The rolling element 12, the holding element 14, and the annular cam 16 cooperatively function to convert relative rotational movement of the annular cam 16 and the holding element 14 into axial movement of the rolling element 12. As shown in FIG. 3A, the first preferred embodiment includes three rolling elements 12. Alternative embodiments may, of course, include more or less than three rolling elements 12. The rolling element 12 is preferably sphere-shaped, but may alternatively have another suitable shape, such as a roller-shape. The rolling element 12 is preferably made with a conventional structural material, such as steel, and from conventional methods, but may alternatively be made with other suitable materials and from other suitable methods.

Figure 3B:
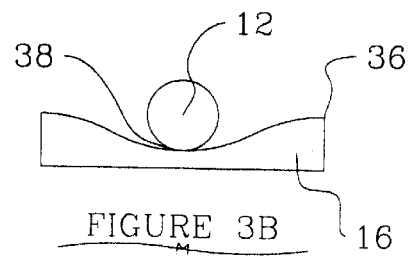
FIG. 3B is a side view of the annular cam and the rolling element of FIG. 3A.

As shown in FIG. 3B, the annular cam 16 preferably functions to cause axial movement of the rolling element 12 as the rolling element 12 revolves around the annular cam 16. The annular cam 16 preferably accomplishes this function with a crest 36 and a trough 38. In the preferred embodiment, the annular cam 16 includes three crests 36 and three troughs 38 (one for every rolling element 12). In alternative embodiments, however, the annular cam 16 may include more or less crests 36 and troughs 38. The annular cam 16 is preferably made with a conventional structural material, such as steel, and from conventional methods, but may alternatively be made with other suitable materials and from other suitable methods.

Figure 3C:
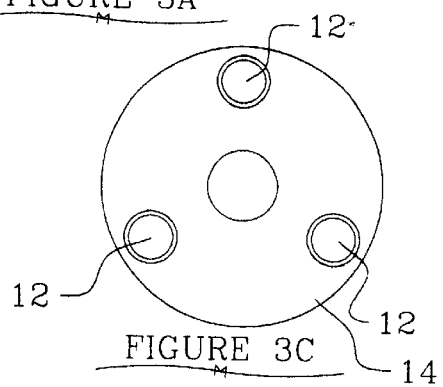
FIG. 3C is a top view of the holding element and the rolling element of the device of FIG. 1.
Figure 3D:
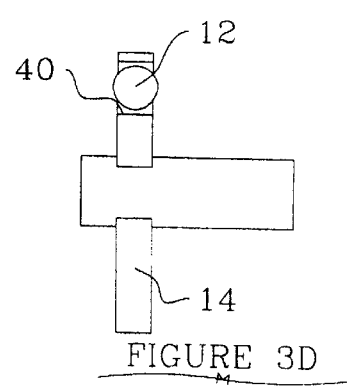
FIG. 3D is a cross-sectional view of the holding element and the rolling element of FIG. 3C.

As shown in FIG. 3C, the holding element 14 preferably functions to contain annular movement of the rolling element 12 and, as shown in FIG. 3D, the holding element 14 also preferably functions to allow axial movement of the rolling element 12. The holding element 14 preferably accomplishes these functions with a cylindrical cavity 40, sized for the rolling element 12. In the preferred embodiment, the holding element 14 includes three cylindrical cavities 40 (one for every rolling element 12). In alternative embodiments, the holding element 14 may include more or less cylindrical cavities 40. The holding element 14 is preferably made with a conventional structural material, such as steel, and from conventional methods, but may alternatively be made with other suitable materials and from other suitable methods.

A shown in FIG. 1, the coupling device 10 of the first preferred embodiment also includes a ring 42 and an axial bearing 44 coupled between the rolling element 12 and the piston 20. The ring 42 and the axial bearing 44 preferably function to transfer the axial movement of the rolling element 12 into an axial movement of the piston 20, while allowing relative rotational movement of the rolling element 12 and the piston 20. Alternative embodiments may include other suitable devices to transfer the axial movement and allow relative rotational movement. The ring 42 and the axial bearing 44 are preferably made with conventional materials and from conventional methods, but may alternatively be made with other suitable materials and from other suitable methods.

The piston 20, which is preferably coupled to the axial bearing 44 and the pressure chamber 18, preferably functions to increase pressure in the pressure chamber 18 upon axial movement of the rolling element 12, the ring 42, and the axial bearing 44. The piston 20 preferably accomplishes this function by pumping a hydraulic fluid (not shown) into the pressure chamber 18. The piston 20 further preferably functions to resist relative rotational movement of the annular cam 16 and the holding element 14 upon the presence of sufficient pressure in the pressure chamber 18. The piston 20 preferably accomplishes this function by resisting axial movement of the rolling element 12, and by effectively holding the rolling element 12 in the trough of the annular cam 16 and preventing the rolling element 12 from revolving around the annular cam 16. Like the ring 42 and the axial bearing 44, the piston 20 is preferably ring-shaped. The piston 20 is preferably made with conventional materials and from conventional methods, but may alternatively be made with other suitable materials and from other suitable methods.

Figure 4:
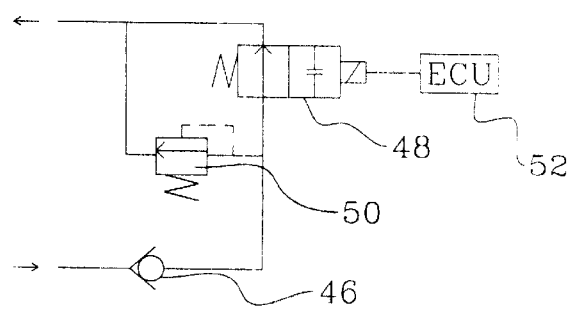
FIG. 4 is a schematic of the valves of the device in FIG. 1.

As shown in FIGS. 1 and 4, the coupling device 10 of the first preferred embodiment also includes a check valve 46, a control valve 48, and a relief valve 50, each preferably coupled to the pressure chamber 18. The check valve 46 preferably functions to allow one-way passage of the hydraulic fluid. The control valve 48 preferably functions to control the pressure in the pressure chamber 18, while the relief valve 50 preferably functions to limit the pressure in the pressure chamber 18. The coupling device 10 of the preferred embodiment may alternatively include other suitable valves or devices that function to suitably condition or alter the hydraulic fluid or pressure in the pressure chamber 18. The check valve 46, the control valve 48, and the relief valve 50 are preferably made with conventional materials and from conventional methods, but may alternatively be made with other suitable materials and from other suitable methods.

The coupling device 10 of the first preferred embodiment also includes an electric control unit 52 coupled to the control valve 48. The electric control unit 52 preferably functions to control the control valve 48 by pulse with modulation, but may function to control the control valve 48 by other suitable methods. By controlling the control valve 48, the electric control unit 52 controls the pressure in the pressure chamber 18. The electric control unit 52 is preferably made with conventional materials and from conventional methods, but may alternatively be made with other suitable materials and from other suitable methods.

As shown in FIG. 1, the coupling device 10 of the first preferred embodiment also includes a housing 54. The housing 54 preferably defines an input opening 56 to receive the input shaft 24, an output opening 58 to receive the output shaft 22, and an interior space to receive the rolling element 12, the holding element 14, the annular cam 16, and the piston 20. The input opening 56 and the output opening 58 may include seals and ball bearings, or other suitable devices, to receive the input shaft 24 and the output shaft 22, respectively. In addition to receiving the rolling element 12, the holding element 14, the annular cam 16, and the piston 20, the interior space also preferably receives the hydraulic fluid. The housing 54 is preferably made with conventional structural materials, such as steel, and from conventional methods, but may alternatively be made with other suitable materials and from other suitable methods.

The coupling device 10 of the first preferred embodiment also includes a valve block 60, which functions to include the check valve 46, the control valve 48, and the relief valve 50. The valve block 60 is preferably coupled to an exterior surface 62 of the housing 54. In this manner, the valve block 60 may be disconnected and replaced without disassembling the housing 54. In other embodiments, one or more of the valves may be located within the bounds of the housing 54 or in other remote locations. The valve block 60 is preferably made with conventional structural materials, such as certain plastics or steel, and from conventional methods, but may alternatively be made with other suitable materials and from other suitable methods.

In the first preferred embodiment, the housing 54 defines the pressure chamber 18. In alternative embodiments, other suitable devices may define the pressure chamber 18. The pressure chamber 18, which functions to cooperate with the piston 20 to pressurize the hydraulic fluid during movement of the piston 20, is preferably ring-shaped, like the piston 20. The pressure chamber 18 and the piston 20, however, may alternatively have other suitable shapes.

The coupling device 10 of the first preferred embodiment also includes a carrier 64 coupled to the input shaft 24 and the annular cam 16. The carrier 64 preferably functions to translate the rotational movement of the input shaft 24 into a rotational movement of the annular cam 16. The carrier 64 preferably includes a ring gear 66 and an internal extension 68. The ring gear 66 of the carrier 64 preferably functions to transfer rotational movement of the input shaft 24 into rotational movement of the carrier 64 about a perpendicular axis. The internal extension 68 of the carrier 64 preferably functions to provide a support surface for the annular cam 16. The carrier 64, including the ring gear 66 and the internal extension 68, is preferably made with conventional structural materials, such as steel, and from conventional methods, but may alternatively be made with other suitable materials and from other suitable methods.

Figure 5:
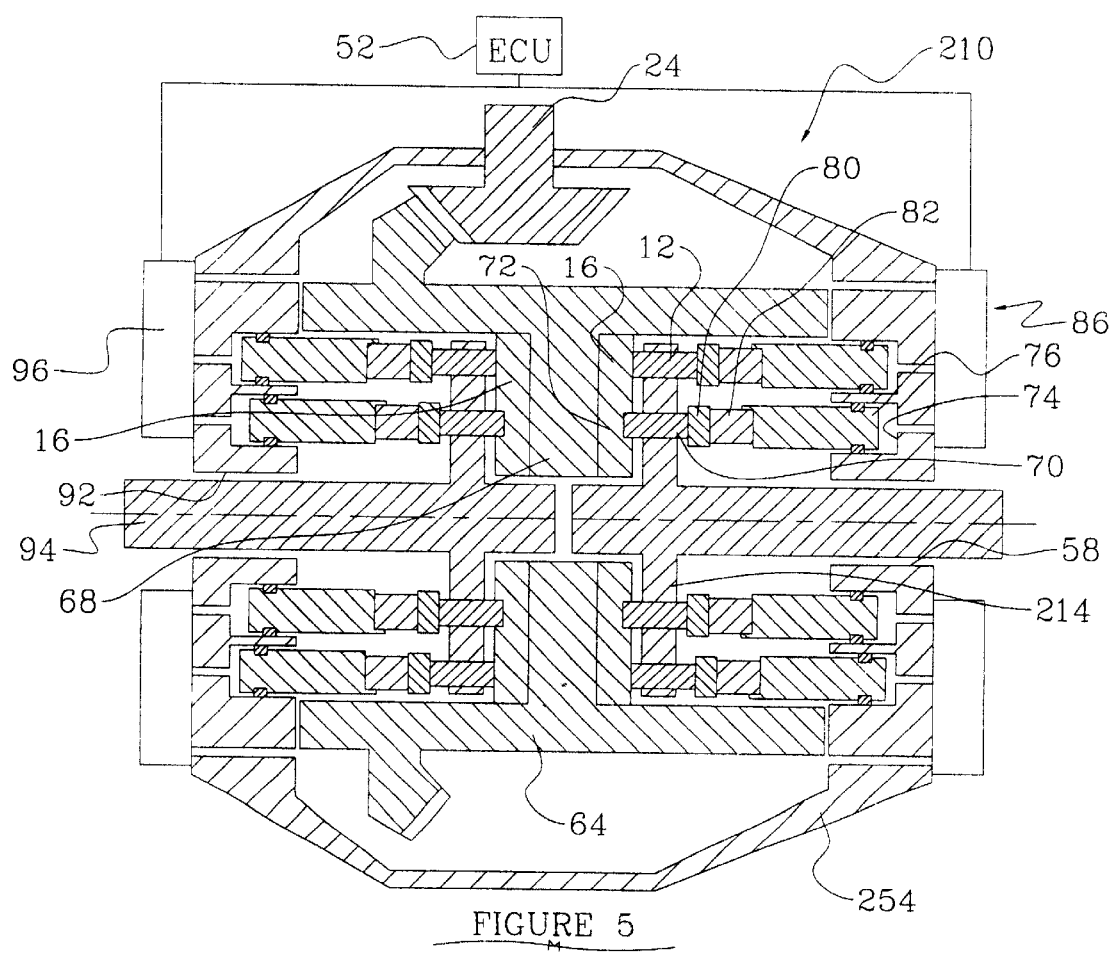
FIG. 5 is a cross-sectional view of the device of the second preferred embodiment.

In some situations, the level of pressure generated by the piston 20 or the number of revolutions of the rolling element 12 around the annular cam 16 to generate a certain level of pressure in the pressure chamber 18 may be inappropriate for the specific application of the coupling device 10. In these situations, the coupling device 210 of the second preferred embodiment may be useful. As shown in FIG. 5, the coupling device 210 of the second preferred embodiment includes a second rolling element 70, a modified holding element 214, a second annular cam 72, a second pressure chamber 74, and a second piston 76. Except for the elements discussed below, the other elements of the second preferred embodiment are preferably identical to the elements of the first preferred embodiment.

Figure 6A:
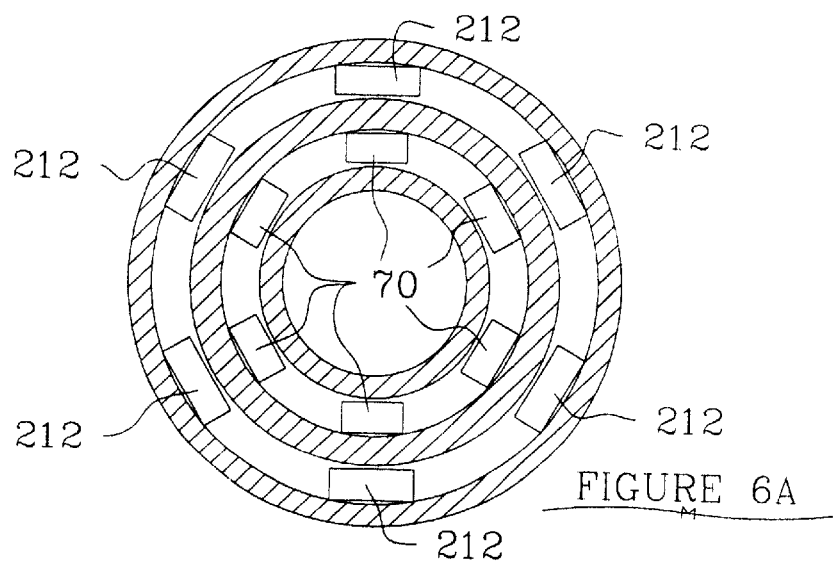
FIG. 6A is a top view of the annular cam and the rolling element of the device in FIG. 5.

The rolling element 12, the second rolling element 70, the modified holding element 214, the annular cam 16, and the second annular cam 72 preferably function to convert relative rotational movement of the annular cam 16 and the modified holding element 214 into axial movement of both the rolling element 12 and the second rolling element 70. As shown in FIG. 6A, the second preferred embodiment includes six rolling elements 212 and six second rolling elements 70, which are preferably displaced interiorly of the rolling elements 212. In the second preferred embodiment, the rolling elements 212 and the second rolling elements 70 are preferably roller-shaped.

Figure 6B:
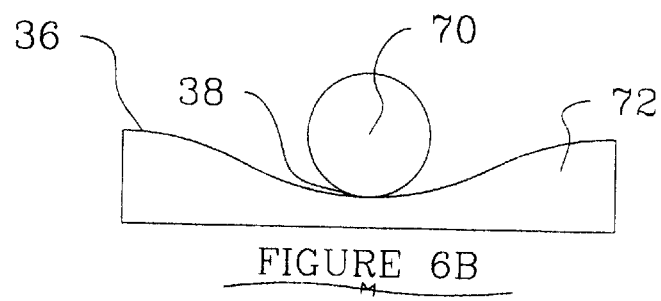
FIG. 6B is a side view of the annular cam and the rolling element of FIG. 6A.

As shown in FIG. 6B, the second annular cam 72 functions to cause axial movement of the second rolling element 70 as the second rolling element 70 revolves around the second annular cam 72 with relative rotational movement. Like the annular cam, the second annular cam 72 preferably accomplishes this function with a crest 36 and a trough 38, which are preferably displaced interiorly of the annular cam. In the preferred embodiment, the annular cam and the second annular cam 72 include six crests 36 and six troughs 38.

Figure 6C:
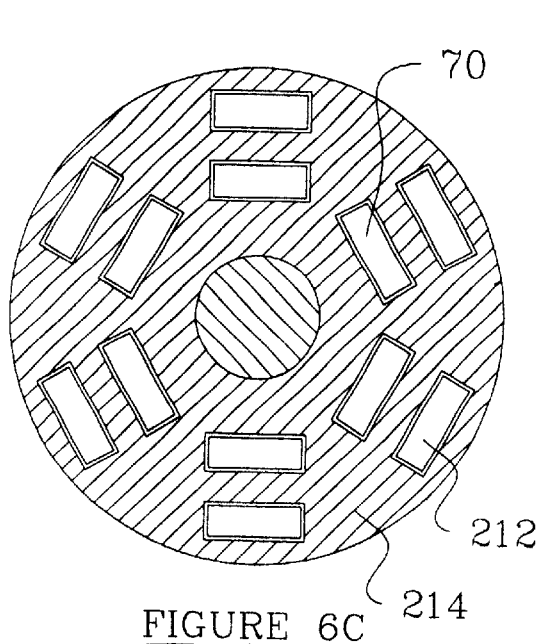
FIG. 6C is a top view of the holding element and the rolling element of the device of FIG. 5.
Figure 6D:
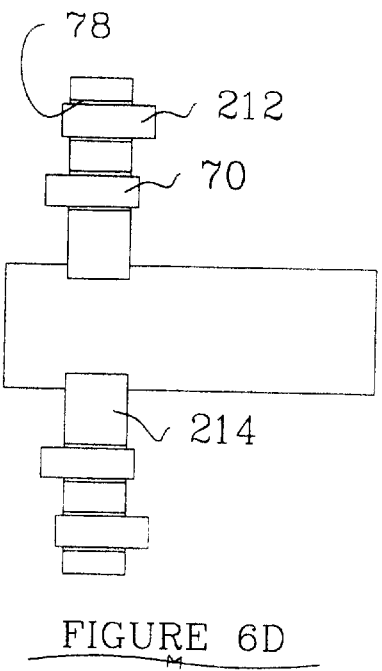
FIG. 6D is a cross-sectional view of the holding element and the rolling element of FIG. 6C.

As shown in FIG. 6C, the modified holding element 214 functions to contain annular movement of both the rolling element 212 and the second rolling element 70. Further, as shown in FIG. 6D, the modified holding element 214 also functions to allow axial movement of both the rolling element 212 and the second rolling element 70. The modified holding element 214 preferably accomplishes these functions with a rectangular cavity 78, sized for the rolling element 212 and the second rolling element 70. In the preferred embodiment, the modified holding element 214 includes twelve rectangular cavities 78 (one for every rolling element 212 and every second rolling element 70).

A shown in FIG. 5, the coupling device 210 of the second preferred embodiment also includes a second ring 80 and a second axial bearing 82 coupled between the second rolling element 70 and the second piston 76. The second ring 80 and the second axial bearing 82 preferably function to transfer the axial movement of the second rolling element 70 into an axial movement of the second piston 76, while allowing relative rotational movement of the second rolling element 70 and the second piston 76.

The second piston 76, which is preferably coupled to the second axial bearing 82 and the second pressure chamber 74, preferably functions to increase pressure in the second pressure chamber 74 upon axial movement of the second rolling element 70, the second ring 80, and the second axial bearing 82. The second piston 76 preferably accomplishes this function by pumping the hydraulic fluid into the second pressure chamber 74. The second piston 76 further preferably functions to resist relative rotational movement of the second annular cam 72 and the modified holding element 214 upon the presence of sufficient pressure in the second pressure chamber 74. The second piston 76 preferably accomplishes this function by resisting axial movement of the second rolling element 70, and by effectively holding the second rolling element 70 in the trough of the second annular cam 72 and preventing the second rolling element 70 from revolving around the second annular cam 72. Like the second ring 80 and the second axial bearing 82, the second piston 76 is preferably ring-shaped.

Figure 7:
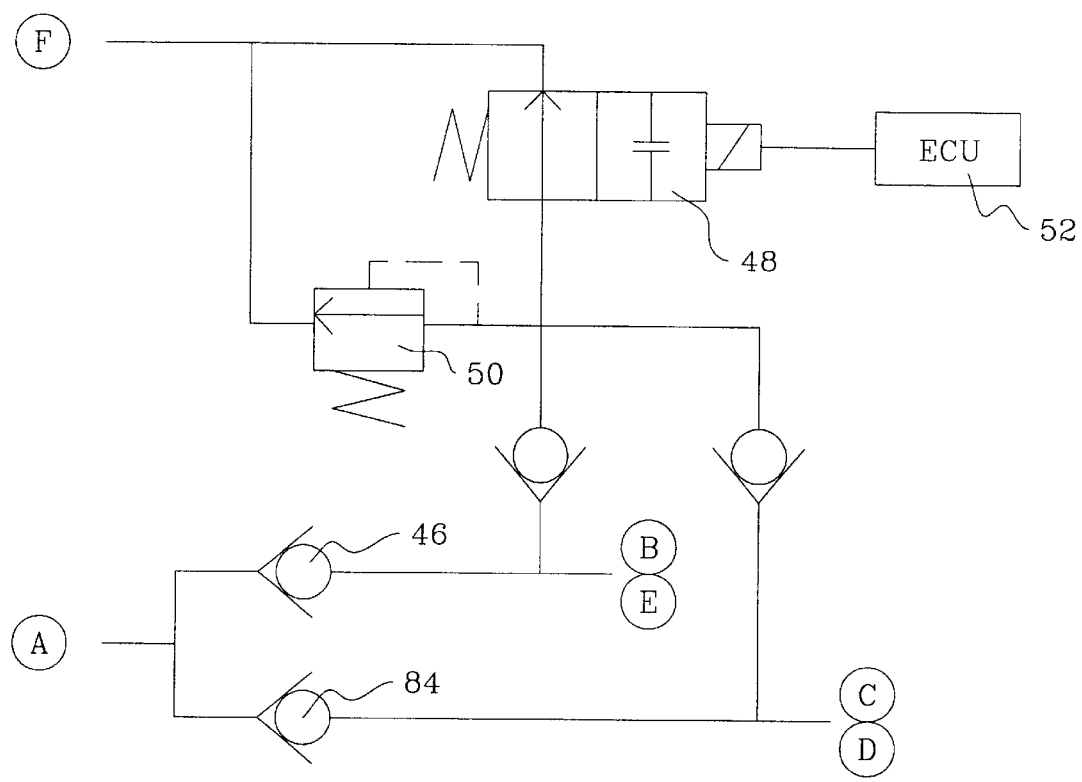
FIG. 7 is a schematic of the valves of the device in FIG. 5.

As shown in FIGS. 5 and 7, the coupling device 210 of the second preferred embodiment also includes a second check valve 84 preferably coupled to the second pressure chamber 74. The second check valve 84 preferably functions to allow one-way passage of the hydraulic fluid through the second pressure chamber 74. In the second preferred embodiment, the pressure chamber 18 and the second pressure chamber 74 are preferably coupled beyond the check valve 46 and the second check valve 84.

As shown in FIG. 5, the modified housing 254 of the second preferred embodiment defines both the pressure chamber 18 and the second pressure chamber 74. The second pressure chamber 74, which functions to receive the hydraulic fluid from the second piston 76, is preferably ring-shaped, like the second piston 76.

In the second preferred embodiment, the annular cam 16 and the second annular cam 72 are preferably positioned to operate in opposite phase. In other words, when the rolling element 12 is on the crest of the annular cam 16, the second rolling element 70 is in the trough of the second annular cam 72. In this manner, the piston 20 and the second piston 76 act as a double-action pump 86. In alternative embodiments, the annular cam 16 and the second annular cam 72 may be positioned to operate in the same phase, while the rolling elements 12 and the second rolling elements 70 are positioned in the holding element to operate in operate phases.

Figure 8:
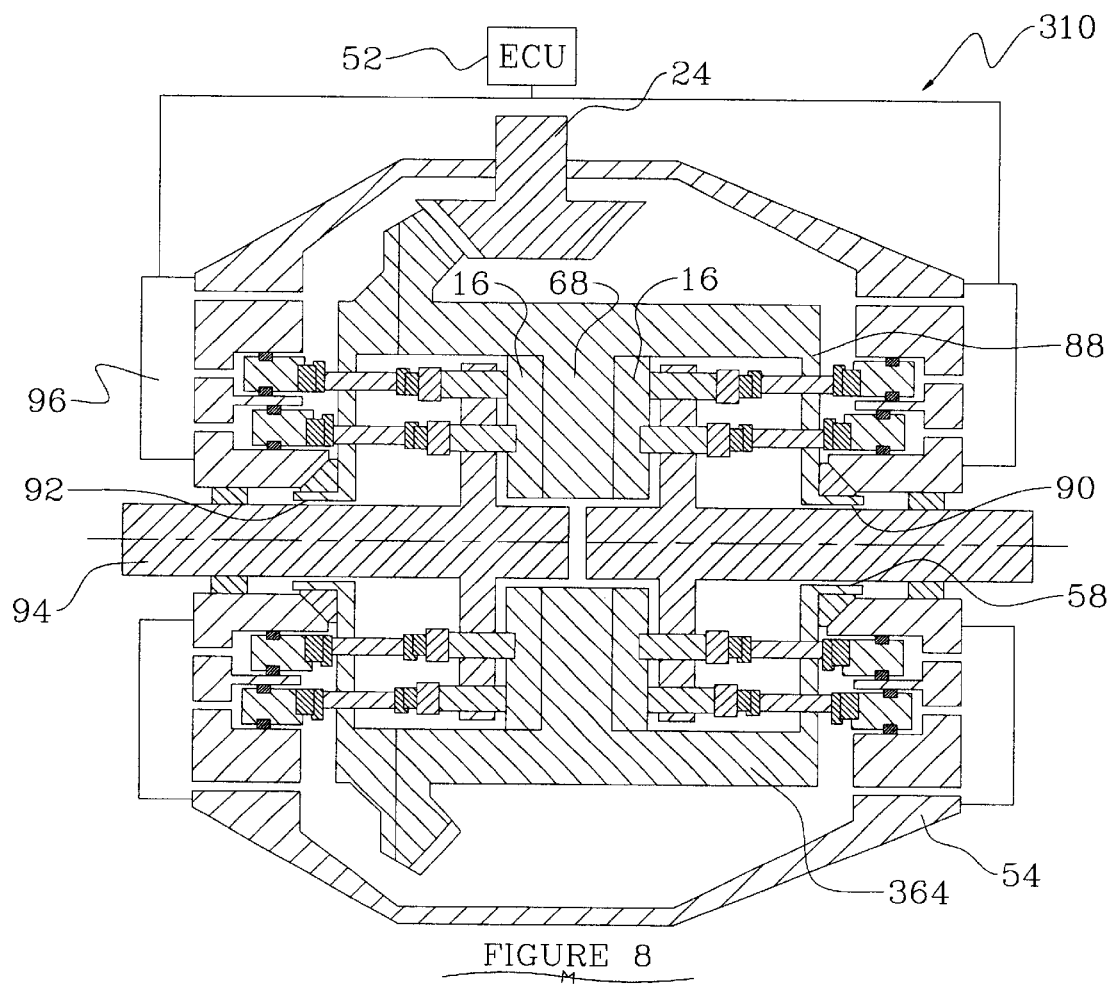
FIG. 8 is a cross-sectional view of the device of the third preferred embodiment.

As shown in FIG. 8, the coupling device 310 of the third preferred embodiment includes a modified carrier 364. The other elements of the third preferred embodiment are preferably identical to the elements of the second preferred embodiment. The modified carrier 364 preferably includes an exterior wall 88 with an exterior extension 90. The realization of this modification allows for the addition of several bearings between the modified carrier 364 and the housing 54, which function to reduce the friction in the coupling device 310. The coupling device 310 may alternatively include other suitable devices to reduce friction.

As shown in FIGS. 1, 5, and 8, the coupling devices 10, 210, and 310 of the preferred embodiments also include a second set of every element discussed above, except the carrier 64, the housing 54, and the electric control unit 52. The carrier 64 is preferably designed to couple the input shaft 24 and an annular cam 16 located on both sides of the internal extension 68. The housing 54 is preferably designed with a second output opening 92 that functions to receive a second output shaft 94. The second output opening 92, like the first output opening 58, may include seals and ball bearings, or other suitable devices, to receive the second output shaft 94. The electric control unit 52 is preferably separately coupled to a second control valve 96. In this manner, the electric control unit 52 may selectively control the pressure in the pressure chamber 18 on one side of the coupling device 10 and in the pressure chamber 18 on the other side of the coupling device 10, thereby selectively distributing torque to the right and left wheels of the vehicle.

As shown in FIG. 1, during the operation of the coupling device 10 of the first preferred embodiment, an engine, or other suitable device, rotates the input shaft 24. The ring gear 66 of the carrier 64 transfers the rotational movement of the input shaft 24 into a rotational movement of the carrier 64. If the output shaft 22, which is connected to a wheel of the vehicle, rotates with the same rotational movement of the carrier 64, the rolling element 12 does not revolve around the annular cam 16 and the piston 20 does not pump the hydraulic fluid into the pressure chamber 18. If, however, the output shaft 22 does not rotate with the same rotational movement of the carrier 64 (i.e., there is relative rotational movement of the carrier 64 and the output shaft 22), the rolling element 12 revolves around the annular cam 16 and the piston 20 increases pressure in the pressure chamber 18. Further relative rotational movement of the carrier 64 and the output shaft 22 causes a further increase of the pressure in the pressure chamber 18. At some point, the pressure in the pressure chamber 18 will be sufficient to resist axial movement of the rolling element 12. By holding the rolling element 12 against the annular cam 16, the coupling device 10 will resist relative rotational movement of the carrier 64 and the output shaft 22. The electric control unit 52 preferably controls the resistance of the relative rotational movement by opening the control valve 48, thereby releasing some of the hydraulic fluid into the interior space of the housing 54 and reducing the pressure.

As any person skilled in the art of automotive coupling devices will recognize from the previous description and from the figures and claims, modifications and changes can be made to the preferred embodiments of the invention without departing from the scope of the invention defined in the following claims.

I claim:

1. A device for coupling an input shaft and an output shaft comprising:
   a rolling element;
   a holding element coupled to said rolling element and the output shaft and adapted to contain annular movement of said rolling element and allow axial movement of said rolling element;
   an annular cam coupled to the input shaft and said rolling element and adapted to cause axial movement of said rolling element upon relative rotational movement of the input shaft and the output shaft;
   a pressure chamber; and
   a piston coupled to said rolling element and said pressure chamber and adapted to increase pressure in said pressure chamber upon axial movement of said rolling element and to prevent further relative rotational movement of the input shaft and the output shaft through the cooperation of said annular cam, said rolling element, and said piston upon the presence of sufficient pressure in said pressure chamber.

2. The device of claim 1 further comprising a control valve coupled to said pressure chamber and adapted to control the pressure in said pressure chamber.

3. The device of claim 2 further comprising a relief valve coupled to said pressure chamber and adapted to limit the pressure in said pressure chamber.

4. The device of claim 2 further comprising an electric control unit coupled to said control valve and adapted to control said control valve.

5. The device of claim 4 wherein said electric control unit is further adapted to control said control valve by pulse width modulation.

6. The device of claim 1 further comprising a housing defining an input opening adapted to receive the input shaft, defining an output opening adapted to receive the output shaft, and defining an interior space adapted to receive said rolling element, said holding element, said annular cam, and said piston.

7. The device of claim 6 wherein said housing defines said pressure chamber.

8. The device of claim 7 further comprising a control valve coupled to said pressure chamber and adapted to control the pressure in said pressure chamber.

9. The device of claim 8 further comprising a relief valve coupled to said pressure chamber and adapted to limit the pressure in said pressure chamber.

10. The device of claim 9 further comprising a valve block coupled to an exterior surface of said housing and adapted to receive said control valve and said relief valve.

11. The device of claim 1 further comprising a second rolling element, wherein said holding element is further coupled to said second rolling element and further adapted to contain annular movement of said second rolling element and allow axial movement of said second rolling element;
    a second annular cam coupled to the input shaft and said second rolling element and adapted to cause axial movement of said second rolling element upon relative rotational movement of said second annular cam and said holding element;
    a second pressure chamber; and
    a second piston coupled to said second rolling element and said second pressure chamber and adapted to increase pressure in said second pressure chamber upon axial movement of said second rolling element and to resist axial movement of said second rolling element upon the presence of sufficient pressure in said second pressure chamber.

12. The device of claim 11 wherein said annular cam and said second annular cam are adapted to operate in opposite phase.

13. The device of claim 1 further comprising a carrier coupled to the input shaft and said annular cam.

14. A method for coupling an input shaft and an output shaft, comprising:
    providing a rolling element;
    providing a holding element, coupling the holding element to the rolling element and the output shaft, and adapting the holding element to contain annular movement of the rolling element and allow axial movement of the rolling element;
    providing an annular cam, coupling the annular cam to the input shaft and the rolling element, and adapting the annular cam to cause axial movement of the rolling element upon relative rotational movement of the input shaft and the output shaft;
    providing a pressure chamber; and
    providing a piston, coupling the piston to the rolling element and the pressure chamber, and adapting the piston to increase pressure in the pressure chamber upon axial movement of the rolling element and to prevent further relative rotational movement of the input shaft and the output shaft through the cooperation of the annular cam, the rolling element, and the piston upon the presence of sufficient pressure in the pressure chamber.

15. The method of claim 14 further comprising providing a control valve, coupling the control valve to the pressure chamber, and adapting the control valve to control the pressure in the pressure chamber.

16. The method of claim 15 further comprising providing a relief valve, coupling the relief valve to the pressure chamber, and adapting the relief valve to limit the pressure in the pressure chamber.

17. The method of claim 14 further comprising providing a second rolling element, coupling the holding element to the second rolling element, adapting the holding element to contain annular movement of the second rolling element and allow axial movement of the second rolling element;
    providing a second annular cam, coupling the second annular cam to the input shaft and the second rolling element;
    adapting the second annular cam to cause axial movement of the second rolling element upon relative rotational movement of the second annular cam and the holding element;
    providing a second pressure chamber; and
    providing a second piston, coupling the second piston to the second rolling element and the second pressure chamber; and adapting the second piston to increase pressure in the second pressure chamber upon axial movement of the second rolling element and to resist axial movement of the second rolling element upon the presence of sufficient pressure in the second pressure chamber.

18. The method of claim 17 further comprising adapting the annular cam and the second annular cam to operate in opposite face.

19. The method of claim 14 further comprising providing a carrier and coupling the carrier to the input shaft and the annular cam.

* * * * *